Aug. 19, 1941.     F. C. LINK ET AL     2,252,937
LEHR LOADER
Filed Aug. 25, 1937     2 Sheets-Sheet 1
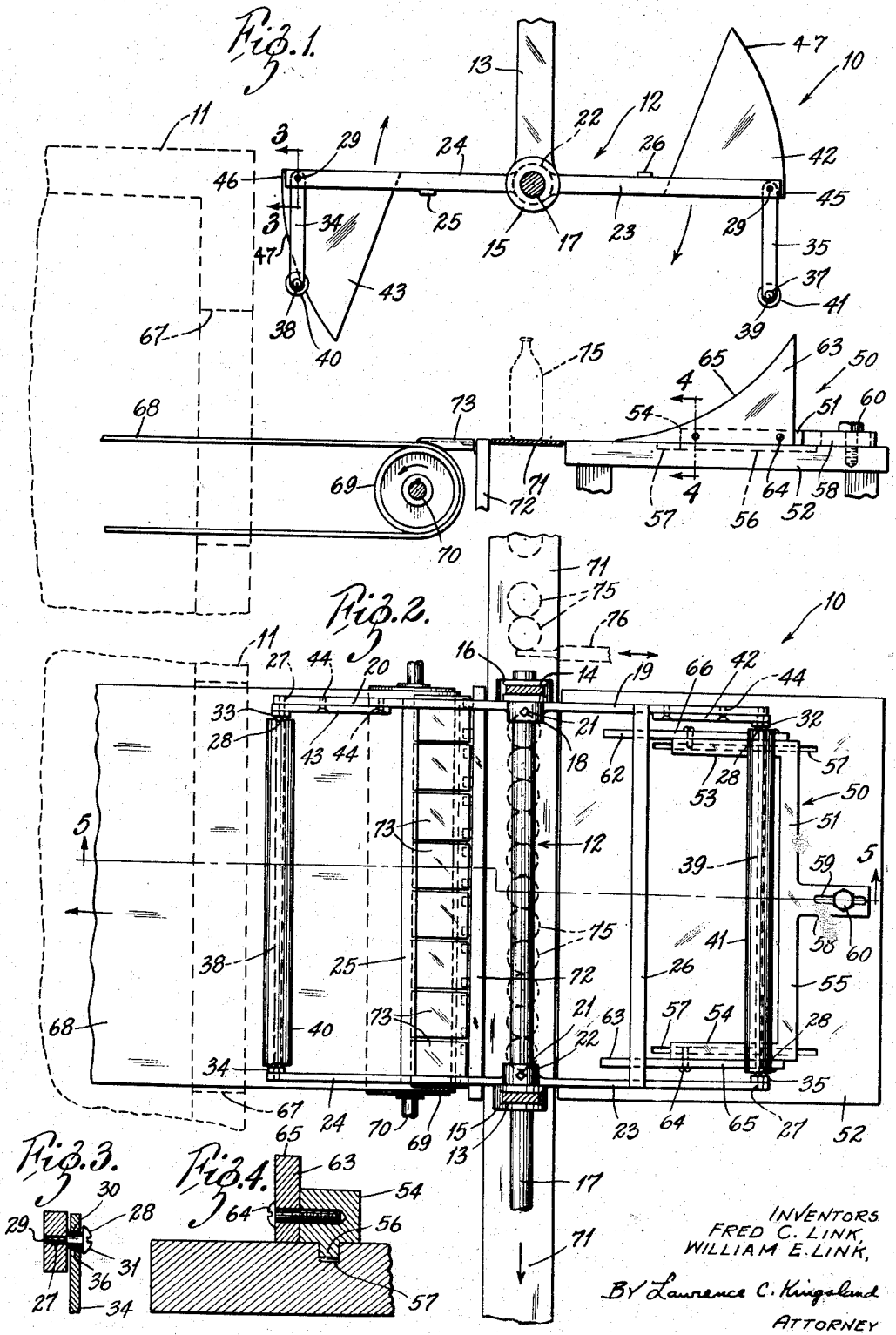
INVENTORS
FRED C. LINK
WILLIAM E. LINK
By Lawrence C. Kingsland
ATTORNEY Aug. 19, 1941.　　　F. C. LINK ET AL　　　2,252,937
LEHR LOADER
Filed Aug. 25, 1937　　　2 Sheets-Sheet 2

INVENTORS:
FRED C. LINK,
WILLIAM E. LINK,
By Lawrence C. Kingsland
ATTORNEY.

Patented Aug. 19, 1941

2,252,937

UNITED STATES PATENT OFFICE 2,252,937

LEHR LOADER

Fred C. Link, East St. Louis, Ill., and William E. Link, St. Louis, Mo.

Application August 25, 1937, Serial No. 160,748

16 Claims. (Cl. 198—25)

The present invention relates generally to glass machinery, and more particularly to a lehr loading device of the rotary type.

An object of the present invention is to provide a novel lehr loader of the continuous rotary type which is adapted to efficiently remove bottles, and the like, from a carrier belt to a second carrier belt leading into and through a lehr.

Another object is to provide a lehr loader of the rotary type which is continuously rotated by a variable speed motor through suitable gearing.

Another object is to provide a lehr loader which includes means for removing bottles, and the like, from a carrier belt onto a second carrier belt leading into and through a lehr by a straight push, and means for effecting a non-interfering retreat of the pusher means.

Another object is to provide a lehr loader which includes a freely mounted roller mounted on a positively moved carrier which is adapted to push bottles onto a belt leading into and through a lehr uniformly, and to withdraw without disturbing the bottles.

Another object is to provide a lehr loader which is adapted to function efficiently in conjunction with various types of lehrs.

Another object is to provide a lehr loader which is relatively uncomplicated in construction and which is therefore adapted to function through a long period of use without getting out of order.

Other objects and advantages will be apparent from the following description, taken in conjunction with the accompanying drawings, in which:

Fig. 1 is a side elevation of a lehr loader constructed in accordance with the concepts of the present invention shown in conjunction with a carrier belt for transporting bottles to a lehr, and a lehr and its carrier belt, parts being broken away;

Fig. 2 is a plan view of the assemblage shown in Fig. 1, the supporting arms of the lehr loader being shown in section, and parts being broken away;

Fig. 3 is a section on the line 3—3 of Fig. 1;

Fig. 4 is a section on the line 4—4 of Fig. 1;

Figure 5:
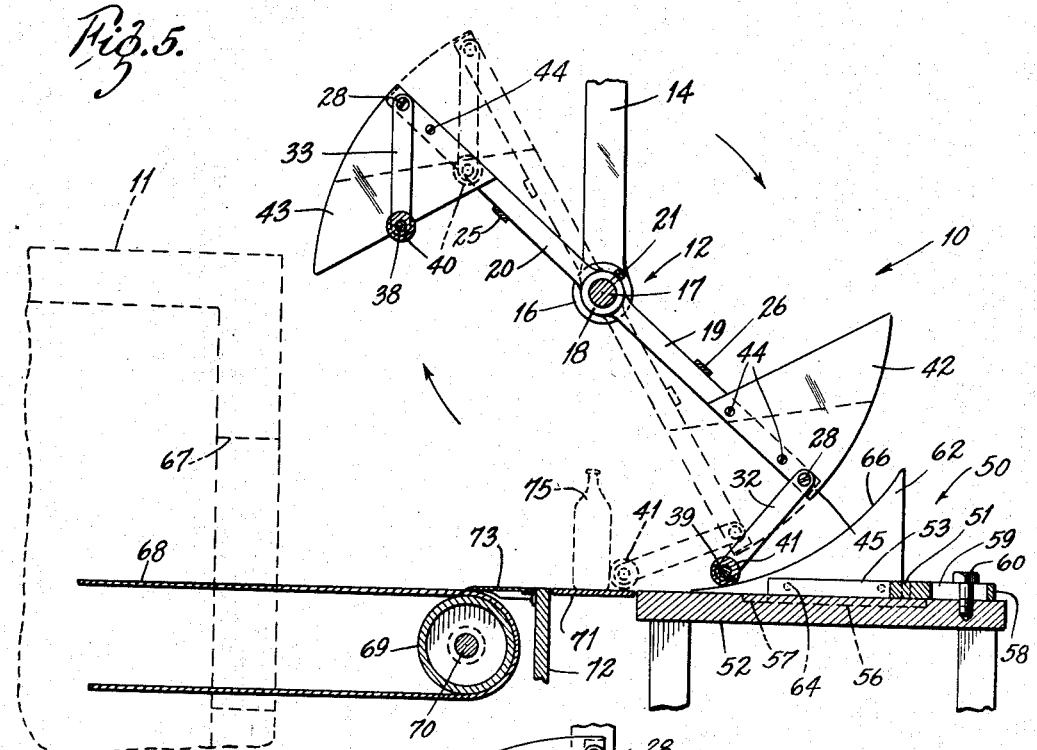
Fig. 5 is a section on the line 5—5 of Fig. 2, the position of the lehr loader being changed to disclose the operation thereof; and, Fig. 6 is a section on the line 5—5 of Fig. 2, the lehr loader being disposed in still another position of operation.

Referring to the drawings more particularly by reference numerals, there is shown in Fig. 1, a lehr loader generally designated 10, which is in operative disposition relative to a lehr 11.

The lehr loader 10 includes a rotatable section generally designated 12. Spaced hanger arms 13 and 14 are fixed to a ceiling, or any desired overhanging support (not shown), and terminate at the free ends in bearings 15 and 16, respectively. A drive shaft 17 is rotatably mounted in the bearings 15 and 16, and is driven by a variable speed motor and suitable gearing (not shown).

A hub 18 having diametrically extending arms 19 and 20 is fixed to the shaft 17 between the hangers 13 and 14 contiguous to the bearing 16 of the hanger 14 by a set screw 21. Similarly, a hub 22 having diametrically extending arms 23 and 24 is fixed to the shaft 17 contiguous to the bearing 15 of the hanger 13 by a set screw 21.

A strap 25 fixed to the arms 20 and 24 and a strap 26 fixed to the arms 19 and 23 assist in forming the arms into a substantially rigid frame. Each of the arms 19, 20, 23, and 24 includes a threaded aperture 27 adjacent the free end. A bolt 28 having a threaded portion 29, an enlarged portion 30, and a head 31 is threadedly engaged in each aperture 27. Links 32, 33, 34, and 35 are freely mounted upon the enlarged portions 30 of the screws 28 by apertures 36 adjacent one end thereof. Each of said links also includes an aperture 37 adjacent the free extremity. A rod 38 is fixed in the apertures 37 of the links 33 and 34 and a rod 39 is fixed in the apertures 37 of the links 32 and 35. Rollers 40 and 41 are rotatably mounted upon the rods 38 and 39, respectively. Upon the arms 19 and 20 are fixed shoes 42 and 43, respectively, by bolts 44, assisted by the above-described screws 28. The shoes 42 and 43 are preferably of a configuration shown in Fig. 1, each having a convex edge 47, and extend beyond the ends of their respective supporting arms 19 and 20 the amount indicated by the reference numerals 45 and 46.

The lehr loader 10 likewise includes a stationary section generally indicated 50. The stationary section 50 comprises a U-shaped member 51 which is mounted upon a stationary support such as a table 52. The member 51 includes legs 53 and 54 and a bight 55. Each of the legs 53 and 54 includes a longitudinal key or tongue 56 which is adapted to slide in a groove 57 formed in the top of the table 52. Projecting from the bight 55 on a plane parallel with the plane of the legs 53 and 54 is a rearward extension 58 having a slot 59 therein which encloses a bolt 60, or the like, fastened into the top of the table 52. It is thus apparent that the member 51 is adapted to be selectively adjusted longitudinally of the slots 57 along the top of the table 52. Guides 62 and 63 are fastened by bolts 64 to the legs 53 and 54, respectively, in the manner shown in Fig. 1. The guides 62 and 63 include arcuate edges 65 and 66, respectively, for a purpose to be described.

The lehr 11 includes an opening 67 through which an endless carrier belt 68 passes. The belt 68 moves around the usual roller 69 which is fixed to a supported shaft 70. An endless carrier belt 71 passes the belt 68 at right angles thereto adjacent the roller 69. The upper surfaces of the belts 68 and 71 are substantially in a common plane. Between the belts 68 and 71 mounted upon a support 72 is a series of platforms or plates 73 which are feathered adjacent the free ends in a manner to merge with the horizontal portion of the belt 68 (Fig. 1) to form a connecting platform between the upper horizontal surfaces of the belts 68 and 71.

Operation

Figure 6:
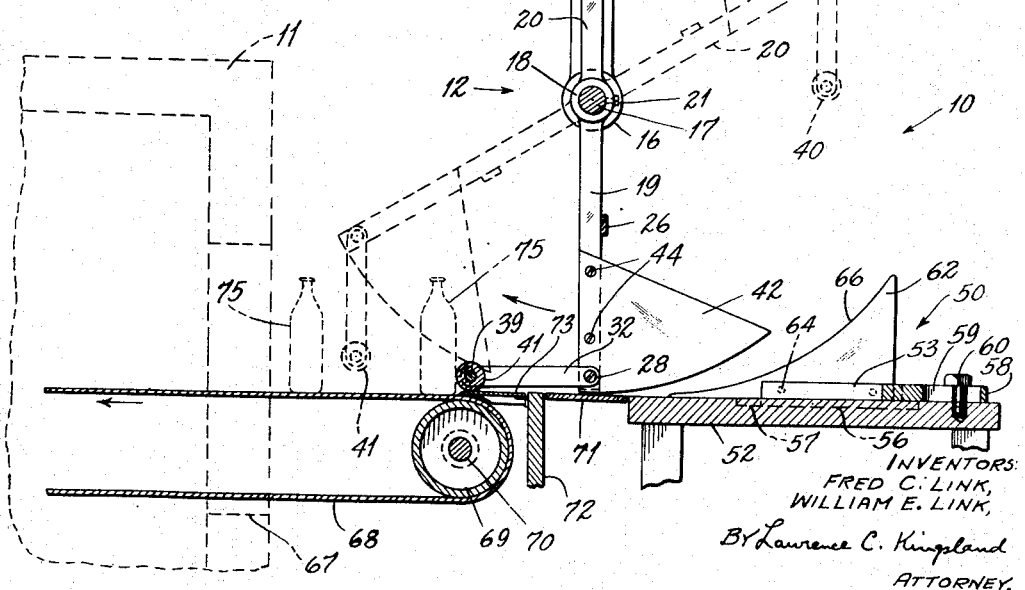

The operation of the rotary lehr loader just described is readily apparent from a consecutive study of Figs. 1, 5, and 6. Spaced bottles 75 are conveyed by the carrier belt 71 from a forming machine, or the like, to the lehr 11. As a number of bottles 75 are positioned by the belt 71 in front of the opening 67 of the lehr 11, the roller 41 is moved downwardly through the rotary movement of the arms 19 and 23 by the power driven shaft 17 until contact is made with the arcuate edges 64 and 65 of the guide 63. Inasmuch as the roller 41 is freely suspended by the arms 19 and 23, it is readily directed by the edges 65 and 66 first to the position shown in full lines in Fig. 5 and then to the position shown in dotted lines in Fig. 5. In the position shown in dotted lines in Fig. 5, the roller 41 contacts the bottles 75 at their bases. As the arms 19 and 23 continue in their rotary movement, the roller 41 is moved to the position shown in full lines in Fig. 6 and then to the position shown in dotted lines in the same figure. It is to be noted that the movement of the bottles 75 from the belt 71 across the plates 73 and well onto the belt 68 is effected through a straight line push of the roller 41. It is to be further noted that, after the full forward movement of the roller 41 has been expended, the roller 41 is withdrawn upwardly in a manner to prevent overturning the bottles 75. The pushing force imparted to the roller 41 is expended when the links 32 and 35 have assumed a straight line continuation of the arms 19 and 23, respectively, since further rotary movement of the arms 19 and 23 starts an upward withdrawal of the links 32 and 35 and the roller 41 carried thereby because of the free or limber neck connection of the links 32 and 35 with the aforesaid arms 19 and 23.

During the time that the roller 41 and the links 32 and 35 are passing across the carrier belt 71, bottles 75 are prevented from movement thereagainst through the means of a conventional stop device 76 (Fig. 2), this device being released after the links 32 and 35 have cleared the belt. The shoe 42 lightly contacts the belt 71 and both insures a satisfactory balanced pushing movement of the roller 41 and serves as a second stop means for preventing bottles from crowding in front of the opening 67.

The rotary motion of the movable section 12 of the lehr loader 10 is continuous and is synchronized with the belt travel or belt loading so that the roller 40 through its associated elements is brought into operative contact with the next group of bottles 75 positioned before the opening 67 of the lehr 11. Thereafterwards, the rollers 39 and 40 alternately move bottles 75 onto the belt 68.

The stationary section 50 of the lehr loader 10 is adjustable so that the rollers 40 and 41 will at all times be brought into operative position relative to the bottles 75 which are to be moved into the lehr 11.

It is apparent that there has been provided a rotary lehr loader having continuous movement which is adapted to fulfill all of the objects and advantages sought therefor. It is simple in construction and operation, yet it is thoroughly effective and efficient in removing bottles from a first carrier onto a second carrier for movement into a lehr. Its structural simplicity insures a long period of operation without break down.

It is to be understood that the foregoing description and accompanying drawings have been given by way of illustration and example and not for purposes of limitation, the invention being limited only by the claims to follow.

What is claimed is:

1. In a device of the kind described, a support, means rotatably mounted on said support for rotation in one direction about a horizontal axis including means bodily movable about the axis of rotation for moving bottles from a first carrier to a second carrier, and means for directing said second means into a position for engaging said bottles, said second means being adapted to withdraw from the bottles in a manner to prevent overturning thereof after being moved onto the second carrier.

2. A rotary lehr loader comprising a support, and a continuously rotating mechanism mounted on said support, said mechanism being mounted for rotation on a horizontal axis and being adapted to slide in the same position bottles from a first carrier belt onto a second carrier belt during a portion of its travel.

3. A lehr loader comprising a movable section and a stationary section, said movable section including a frame mounted for rotary movement, and rollers freely suspended from and permanently connected to the frame, said rollers being adapted to slide ware from one carrier to another carrier and to withdraw from contact with the ware without upsetting the same, said stationary section including a guide for directing said rollers through a segment of their travel.

4. A lehr loader comprising a movable section and a stationary section, said movable section including supported hanger arms, a driven shaft journaled in said hanger arms, a frame fixed to said shaft including arms extending diametrically therefrom, and a roller freely suspended from each free end of the frame, said stationary section including guides for directing said rollers to a position to be pushed through a portion of their travel by the frame arms to which they are attached.

5. A lehr loader comprising a support, means mounted on said support for driven rotary movement, and means mounted upon said first means for free rotary movement, said last means being adapted to be pushed through the medium of said first means to move bottles from a first carrier to a second carrier, said last means being adapted to be pulled by said first means after said movement of the bottles has been accomplished.

6. A lehr loader comprising a support, diametrically opposed pairs of arms mounted upon said support for driven rotary movement, and a roller freely suspended by links from the free ends of each pair of arms, said rollers being in permanent association with said arms, whereby in a rotation of the arms through 360° each roller will be moved through 360° of rotation in one direction about the main pivot axis and simultaneously through 360° about the axis of rotation of its links in the other direction.

7. In combination with a lehr, a lehr carrier belt, and a carrier belt for moving bottles past the lehr carrier belt, a lehr loader comprising continuously rotating means for pushing bottles from the said second belt onto said first belt by a continued straight line action, said means being adapted to withdraw from the bottles in a manner to prevent overturning of the bottles moved onto the lehr carrier belt.

8. In combination with a lehr, a lehr carrier belt, and a carrier belt for moving bottles past the lehr carrier belt, a lehr loader comprising a movable section and a stationary section, said movable section including a rotatable frame and rollers freely suspended from said rotatable frame, said frame being supported in a manner to permit the frame to pass relatively close to the second belt in its rotary movement, said stationary section including means for directing successively said rollers into an operative position whereby they are pushed by means of their respective supporting frame sections against bottles on the said second belt which are therethrough pushed from the second belt onto the said first belt, further movement of said frame being adapted to withdraw the respective operative roller away from the bottles in a following position relative to the frame.

9. In combination with a lehr, a lehr carrier belt, and a carrier belt for moving bottles past the lehr carrier belt, a lehr loader comprising a pair of hangers mounted directly above the said second belt, a driven shaft journaled within the hangers and disposed longitudinally of that portion of the second belt which passes the said first belt, diametrically opposed pairs of arms fixed to said shaft of a length to extend relatively close to said second belt when in vertical position, a roller freely suspended by links from the free ends of each pair of arms, and means to direct each of said rollers successively into a position to precede its respective pair of arms as the said arms descend in approaching bottles upon said second belt, each of said rollers being successively adapted to push the bottles from the second belt onto the first belt through the continued rotation of its respective pair of arms, said movement of the bottles being continued onto the first belt until the links supporting the roller in operation assume a position forming a continuation of the respective pair of arms to the ends of which they are freely mounted, further rotation of said respective pair of arms being adapted to withdraw said links and their associated roller upwardly in a following position relative thereto.

10. A lehr loader comprising a member mounted for rotary movement about a horizontal axis in one direction, means rotatably supporting said member, and means pivotally connected to said member for bodily movement about the horizontal axis adapted to slide in the same position glassware from one carrier onto another carrier.

11. A lehr loader comprising a movable section and a stationary section, said movable section including a frame mounted for rotary movement, and means freely suspended from the frame adapted to engage and to move glassware from one carrier to another carrier, said stationary section including means for directing said first means into glassware engaging position.

12. A lehr loader comprising a member rotatable about a horizontal axis intermediate the ends thereof, means supporting said member for rotary movement, means connected to each end of said member adapted alternately to slide glassware from one carrier to another carrier, and means for directing said glassware moving means into operative positions.

13. A lehr loader comprising a member rotatable about an axis intermediate the ends thereof, means supporting said member for rotary movement, an element freely suspended from each end of the member, and means to direct said elements along a path to engage ware units on a carrier, said elements being parallel to the axis of rotation of the member, said elements being adapted to move ware units from one carrier to a second carrier.

14. A lehr loader comprising a frame mounted for rotary movement, means rotatably supporting said frame, an element freely suspended from said frame, and means for directing said element into position to engage and move glassware from one carrier onto another carrier.

15. In combination with a lehr, a lehr ware carrier, and a carrier for moving ware into adjacent relationship with the lehr ware carrier, a lehr loader comprising a support, means mounted on said support for driven rotary movement about a horizontal axis, and means connected to said first means for bodily rotation therewith about the horizontal axis, said second means being adapted to move conveyed ware from the second carrier to the lehr ware carrier, said second means being adapted to withdraw from contact with the ware without upsetting the same.

16. A lehr loader comprising a support, a frame rotatably connected to said support intermediate its ends for rotation about a horizontal axis, a pair of links pivotally connected to each end of the frame, a roller rotatably mounted between the free ends of each pair of links, and means for positively directing a roller into preceding relationship with its supporting links during a portion of the rotation of the frame.

FRED C. LINK.
WILLIAM E. LINK.